(No Model.)
J. L. HALL & F. H. CHASE.
FRUIT PITTER.
No. 496,734. Patented May 2, 1893.
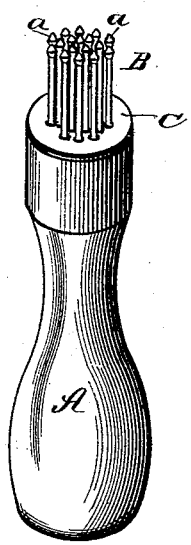
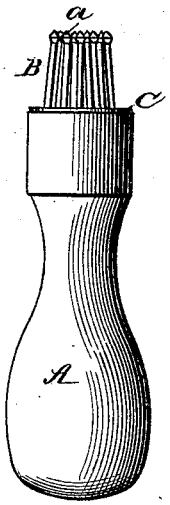
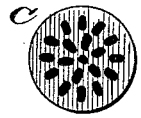
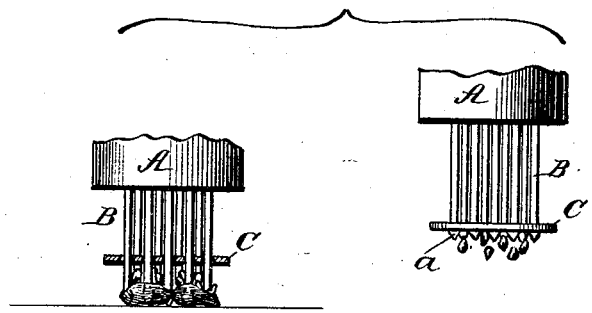
WITNESSES:
Fred G. Dieterich
Amos W. Hart
INVENTORS
James L. Hall
Frank H. Chase
BY Munn & Co
ATTORNEYS.

UNITED STATES PATENT OFFICE.

JAMES L. HALL, OF KINGSTON, MASSACHUSETTS, AND FRANK H. CHASE, OF GRAND RIVERS, KENTUCKY.

FRUIT-PITTER.

SPECIFICATION forming part of Letters Patent No. 496,734, dated May 2, 1893.

Application filed February 9, 1893. Serial No. 461,626. (No model.)

*To all whom it may concern:*

Be known that we, JAMES L. HALL, of Kingston, in Plymouth county and State of Massachusetts, and FRANK H. CHASE, of Grand Rivers, Livingston county, in the State of Kentucky, have invented a new and improved Fruit-Pitter, of which the following is a specification.

Our invention is an improvement in devices for removing the stones, or seeds, from small fruits, especially raisins. The body or main portion of the device is composed of a series of elastic fingers which are set in a suitable holder, side by side, and provided with double conical heads.

The invention also includes a seed-discharger which is in the form of a perforated plate adapted to slide on the said prongs, or fingers.

In the accompanying drawings—Figure 1 is a perspective view of the preferred form of the invention. Fig. 2 is a side view of a modified arrangement. Fig. 3 shows a modified form of head for the elastic fingers. Fig. 4 is a plan view of the seed-discharger. Fig. 5 illustrates the practical use of the device.

A indicates a wooden handle, or holder, and, B, a series of elastic prongs, or fingers, which are provided with enlarged heads, $a$, and rigidly attached to said handle. These fingers may be arranged parallel to each other, as shown in Fig. 1, or slightly converging, as shown in Fig. 2. They are formed of thin, round, or flat, steel wires, or rods, and the enlarged heads, $a$, have, preferably, a double-conical form, as shown in Figs. 1 and 2. They are preferably set equidistantly in the handle, and about three-sixteenths of an inch apart.

C indicates the seed-discharger, it being a thin perforated plate adapted to slide on the fingers B.

In using the device, the raisins or other small fruit to be seeded, are spread upon a table, or other flat surface, and the points of the spring fingers, B, are then forced, by pressure, through the skin and pulp of the raisins, in which operation the seeds pass between the heads, $a$, of said fingers, into the spaces between the shanks of the latter, where they are held as shown in Fig. 5. The device is then inverted, and the pulp detached and seeds discharged. The latter operation may be effected by means of a tool inserted between the fingers, B; but we prefer, as more effective for this purpose, the sliding perforated plate, C, before referred to. The latter is forced outward by pressure, applied manually, till arrested by the heads, $a$, of the fingers, as indicated in Fig. 5, thus forcing the seeds out between the said heads. It will be seen, that the holes in the plate, C, are made considerably larger than the shanks of the fingers, B, but slightly smaller than their heads, $a$, so that the inner ends of the latter will enter said holes and thus allow the plate to be forced as far out on the fingers as possible, so that its outer surface is in the same plane as the minor, or transverse, axis of said heads, $a$. When the fingers are arranged convergently, as shown in Fig. 2, it is apparent more space is provided between their shanks for reception of and holding seeds. The latter may, in such case, be conveniently dislodged by pushing them backward between the shanks of the fingers, by means of a knife blade, or other suitable implement. If the perforated plate, C, be applied to the convergent fingers, the holes therein may be slightly elongated, radially, as shown in Fig. 4, to allow space for the fingers and thus avoid undue friction between them and the plate, C. It is obvious that the fingers may be made double-pyramidal in shape—as in Fig. 3—and yet attain the same result. And while we prefer these two forms of heads, $a$, we propose to employ any others that may be found efficient. It is also apparent, that the handle, or holder, A, may be attached to and operated by a pivoted lever, instead of being adapted, as here shown, to be conveniently grasped and held by the hand.

The device is very simple, cheap, and durable, yet efficient for its function, besides being adapted to be easily cleaned.

Having thus described our invention, what we claim, and desire to secure by Letters Patent, is—

1. A small-fruit pitter, or seeder, composed of a series of elastic prongs, or fingers, attached to a suitable holder, arranged side by side, and having enlarged heads of double-conical form, substantially as shown and described.

2. A small-fruit pitter, or seeder, composed of a series of elastic prongs, or fingers, secured to a suitable holder, and arranged converging at their free ends, as shown and described.

3. The combination, with the elastic prongs, or fingers, set in a suitable holder, of the seed-discharger, consisting of a perforated plate adapted to slide on said fingers, as shown and described.

4. The combination with the elastic fingers, set in a suitable holder and having enlarged conical heads, of the seed-discharger, composed of the plate having a series of perforations which are considerably larger than the shanks, but slightly narrower than the heads, of said fingers, as shown and described for the purpose specified.

5. The combination, with a series of elastic fingers, arranged convergently, as specified, of the seed-discharger consisting of a plate having a series of holes which are elongated radially, as shown and described.

JAMES L. HALL.
FRANK H. CHASE.

Witnesses:
L. W. Chase,
W. F. Balch.